May 9, 1967 J. F. STROUP ETAL 3,317,958
EXTRUDER
Filed Aug. 17, 1964 2 Sheets-Sheet 1

INVENTORS
JOHN F. STROUP
ERNEST S. THEISS

BY
Oberlin, Maky & Donnelly
ATTORNEYS

May 9, 1967    J. F. STROUP ETAL    3,317,958
EXTRUDER
Filed Aug. 17, 1964    2 Sheets-Sheet 2
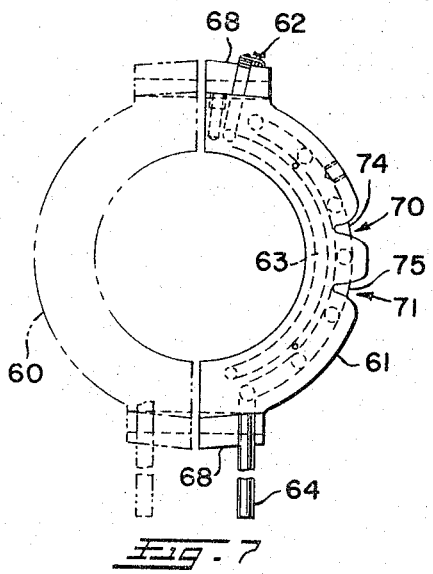
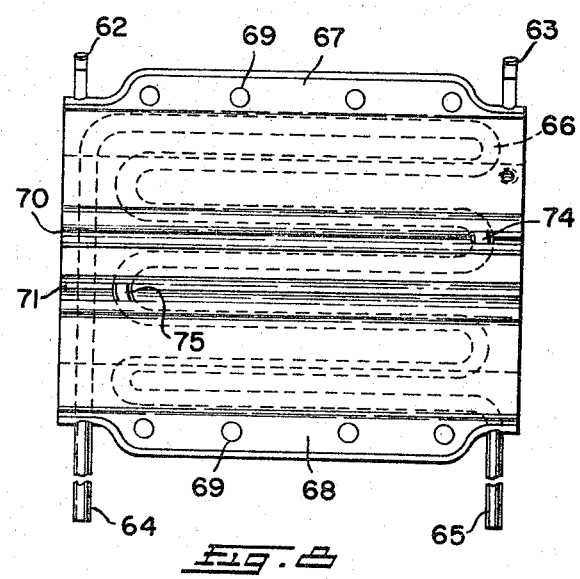
INVENTORS.
JOHN F. STROUP
ERNEST S. THEISS
BY
Oberlin, Maky & Donnelly
ATTORNEYS

United States Patent Office 3,317,958
Patented May 9, 1967

3,317,958
EXTRUDER
John F. Stroup, Cuyahoga Falls, and Ernest S. Theiss, Kent, Ohio, assignors to NRM Corporation, Akron, Ohio, a corporation of Ohio
Filed Aug. 17, 1964, Ser. No. 390,160
7 Claims. (Cl. 18—12)

This invention relates generally as indicated to an extruder and more particularly to a zone temperature control unit for screw extruders.

In such extruders, a raw material, usually in pellet form, is fed to a screw rotating within a barrel or cylinder which forces the material through the barrel, a breaker plate, and finally a die at extremely high pressures. The frictional heat input of the system causes the material to form a melt or extrusion material which is then formed to the desired shape by the die. The temperature of the extrusion material must be closely controlled as the cylinders of the extruders are usually divided into a plurality of controlled zones to permit greater flexibility of operation and to meet the temperature demands of different areas. Moreover, it is desirable to extrude the product at low temperature in that a cooler plastic material is more viscous and holds its extruded shape better. Furthermore, the material distribution is improved as well as polymer degradation minimized. Low temperature extrusion results in better physical properties and appearance of the end product and variations in flow and gauge can be held to close limits. Where the extrusion material is to be blow molded, parisons are more uniform in that there is no need to allow extra material to compensate for thick and thin walls and, of course, in any extrusion product, the lower the temperature thereof, the shorter the cooling cycle.

In order to extrude at the desired precise low temperature, a substantial amount of heat must be removed from the extrusion material within the barrel and a superior cooling or temperature control system is required. Moreover, the temperature control within the various zones of the extruder must be maintained within very close tolerances at the desired temperature. Such temperature tolerances are difficult to maintain and good heater contact with the exterior surface of the cylinder or barrel is essential for uniform heat transfer. It will be appreciated that a small air gap, even of a few thousands of an inch, will insulate the heater from the cylinder.

Heater units are normally arcuate cylindrical sections which are clamped to the cylinder and to obtain the desired heater-cylinder contact, a plurality of sections having a relatively short circumference may be employed. However, for each section, individual terminals for the electrical heater elements or connections for the fluent cooling must be provided and such increases the cost and complexity of the construction.

It is accordingly a principal object of the present invention to provide an extruder affording precise control of extruder temperatures.

Another principal object is the provision of an extruder in which rapid heat removal from the barrel can be obtained to enable quality low temperature extrusions.

Another object is the provision of a simplified temperature control jacket for an extruder barrel which will closely conform to the O.D. thereof to obtain uniform highly efficient heat transfer.

Still another object is the provision of a simplified yet highly efficient zone temperature control unit for screw extruders providing high heat removal ability and temperature control accuracy.

Yet another object is the provision of cast aluminum heater shells for extruder barrels having the heating and cooling coils cast therein and constructed in a manner to provide optimum heat transfer between the shell and barrel.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 7 is an end elevation similar to FIG. 2 of another form of heater shell in accordance with the present invention; and FIG. 8 is a side elevation of the shell shown in FIG. 7.

Figure 1:
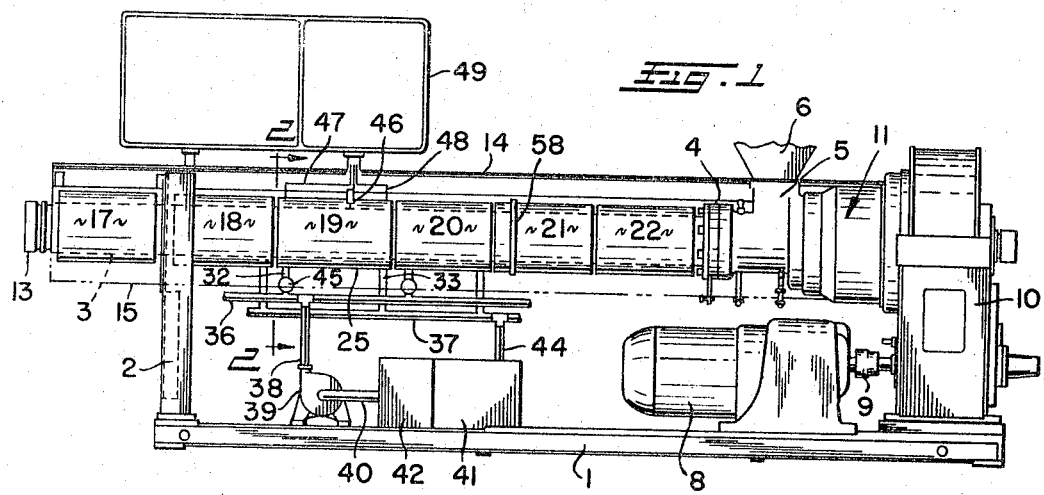
FIG. 1 is a fragmentary side elevation of an extruder in accordance with the present invention with the heating and cooling connections to the zone heater shells shown schematically.

Referring now to the annexed drawings and more particularly to FIG. 1, the extruder is mounted on a full length, box-section, fabricated base 1 which includes a stand or support 2 at the front thereof supporting the front end of the extruder barrel 3. The rear of the barrel is connected at 4 to a hopper section 5 on which hopper 6 is mounted to feed the raw material to the extruder. The screw, not shown, is driven by motor 8 mounted on the base 1 beneath the hopper section 5. The motor is connected at 9 to a drive transmission 10 which in turn drives the screw mounted at its rear in thrust bearings 11. Rotation of the screw thus feeds the raw material from the hopper 6 into the barrel 3 and the heat provided mostly by the frictional heat input reduces the material to a thoroughly mixed melt or extrusion material which is then forced through a breaker plate and die mounted on the discharge end 13 of the barrel 3. A cover 14 surrounds the barrel and may be provided with removable side plates indicated in phantom lines at 15.

Figures 2, 3:
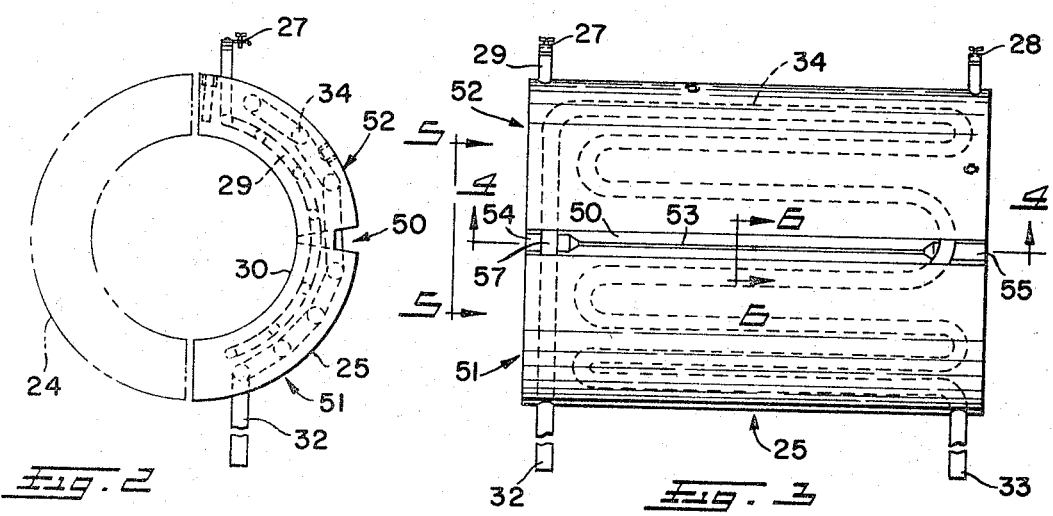
FIG. 2 is a fragmentary end elevation of a heater jacket on an enlarged scale as seen from the line 2—2 of FIG. 1.
FIG. 3 is a side elevation of the shell illustrated in FIG. 2.
Figures 4, 5, 6:
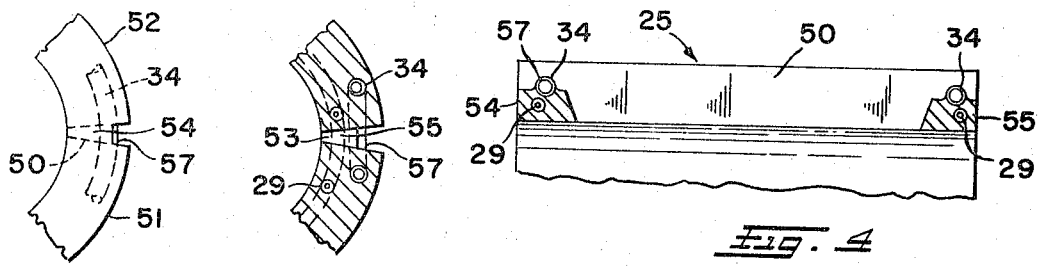
FIG. 4 is a longitudinal section of the shell taken substantially on the line 4—4 of FIG. 3.
FIG. 5 is a fragmentary end elevation of the shell as seen from the line 5—5 of FIG. 3.
FIG. 6 is a fragmentary vertical section as seen from the line 6—6 of FIG. 3.

The illustrated extruder is provided with a plurality of heating and cooling zones indicated at 17, 18, 19, 20, 21 and 22 along the length of the barrel 3, each of which is enclosed by two semi-circular cast aluminum heat transfer shells 24 and 25 as indicated in FIG. 2. The two heater jackets or shells for each zone may be identical in form and accordingly twelve such jackets will be provided on the illustrated extruder barrel. Since the heater jackets or shells are identical in form, only the shell 25 will be described in detail.

The shell 25 at its top includes terminal clips 27 and 28 connected to the projecting ends of heater element 29 which extends in a serpentine fashion within the cast aluminum shell slightly yet uniformly spaced from the interior surface 30 thereof. The element 29 may be of the electrical resistance type although other types of heating units may be provided. The shell 25 comprises a heat conducting matrix holding the heater element 29 in the proper position with respect to the external diameter of the barrel around which the shell is clamped.

At the bottom of the shell 25 there is provided tubing ends 32 and 33 of sinuously arranged tubular cooling element 34 which may be approximately ½″ O.D. 20 gauge welded stainless steel or Incoloy tubing which in the illustrated embodiment may be approximately 10′ in length per shell. Normally, all of the heating and cooling tube loops are equally spaced in each shell section for uniform application or removal of heat.

Referring again to FIG. 1, it will be seen that the tubing ends 32 and 33 for each of the shell half sections for the six zones illustrated are connected respectively to headers 36 and 37. The header 36 is connected through line 38 to circulating pump 39 which draws fluid from line 40 leading from sump 41 and heat exchanger 42. The sump 41 is connected through line 44 to the return header 37. Solenoid valve 45 may be provided in the inlet end connection 32 for each of the cooling units 34 and such valves may be operated at the direction of pyrometer type temperature controllers, the sensing elements of which are mounted in the shells as indicated schematically at 46 in FIG. 1. Such temperature controllers may also be employed to energize and deenergize the electrical heater in each jacket, the connections for which are indicated at 47 and 48 leading to overhead control cabinet 49. The control cabinet 49 may contain all of the instrumentation and controls including the pyrometer type temperature controllers which may have standard scale ranges from 0 to 800° F., for example. The cabinet 49 also contains the standard controls such as the drive motor ammeter, ultra-precise screw speed tachometer, start-stop push buttons, switches for the heating and cooling controls, pilot lights, and like instruments.

The liquid cooling system is mounted beneath the cylinder in the same manner as the drive motor 8 to provide a compact extruder. The cooling system is self-contained and preferably of the closed circuit treated water system type affording precise control of the heat removal along the barrel of the extruder. The temperature controllers in cabinet 49 may be preset to afford a very narrow range of temperature variation such as, for example, plus or minus 1° F. As an example, there will be one heating element per half shell at 3 kw. and, of course, two heating elements per zone or complete shell at 6 kw. at about 230 volts. The heating elements of each half of a complete jacket may be connected in series for about 460 volts.

It can now be seen that the shell 25 serves as a matrix for both the heater element 29 as well as the cooling element 34 spacing both radially from each other as well as the interior surface 30 of the shell. Additional layers of cooling tubing may be provided in instances requiring high seat removal. It can now be seen that a compact highly efficient heat transfer unit for extruders is provided. However, the efficiency of such unit may be affected by the ability of the interior surface 30 of the jacket to conform to the exterior of the barrel or cylinder of the extruder. An ideal situation would be to segmentalize the semi-cylindrical shell into a plurality of longitudinally extending slats, but this would require terminal connections for both the heating and cooling elements. This would result in extremely complex and thus expensive structure.

In order that the jacket will conform closely to the exterior of the barrel, the shell 25 is provided with a built-in weakness in the form of a longitudinally extending groove 50 dividing the shell 25 into two quadrants 51 and 52. The groove 50 is V-shaped and extends at its top completely longitudinally of the shell and in the center over the major portion thereof extends completely through the depth of the shell. This forms a narrow slot 53 extending completely through the shell and at each longitudinal end of the slot the shell casting is provided with bridge portions 54 and 55 which join the two quadrants of the shell. The heating element 29 extends through the bridge portions in a completely embedded manner while the cooling tubing 34 passing between the quadrants is partly exposed as indicated at 57. The shell of the FIG. 3 embodiment will normally be held to the barrel of the extruder by stainless steel straps or clamps illustrated at 58 in FIG. 1 and it will now be seen that the groove 50 provides a longitudinal weakness or broken back in the cast aluminum shell permitting the same to flex and conform to the exterior of the barrel regardless of tolerances or changes in dimension as the result of temperature changes. In this manner, direct contact is provided between the interior surface of the casting and the exterior surface of the cylinder or barrel providing the most efficient heat transfer.

In FIGS. 7 and 8, there is illustrated a further embodiment of the heater shell in which the shell surrounding the barrel may comprise two semi-cylindrical aluminum castings 60 and 61. The shells 60 and 61 are identical and accordingly only the shell 61 will be described in detail. Terminal clips 62 and 63 are provided at each end of the shell 61 at the top thereof for connection to the electrical wiring as indicated in FIG. 1 and such terminal clips form the ends of the sinuously arranged heater element 63 within the shell. At the bottom of the shell, tube ends 64 and 65 are provided which form the connections for the cooling water provided to the sinuously arranged cooling tube 66 within the shell providing the cooling unit. The top and bottom of the shell are provided with flanges 67 and 68 having apertures 69 therein which will be aligned with similar apertures in the flanges of the opposed identical shell. In this manner, clamping bolts or the like may be employed through such apertures firmly to secure the shells together in a thoroughly clamped condition about the barrel or cylinder of the extruder. The shell 61 is provided with two longitudinally extending grooves 70 and 71 which extend the complete length of the semi-cylindrical shell and which are of uniform depth throughout. In this embodiment, the grooves do not extend completely through the shell as in the FIG. 3 embodiment and the cooling tube 66 may be exposed by the respective grooves as shown at 74 and 75. In any event, the grooves 70 and 71 in the back of the shell create intentional weaknesses in the casting permitting the same to flex and conform to the exterior of the barrel. It will be appreciated that additional grooves or weaknesses may be provided to obtain the desired conformance between the interior surface 76 of the shell and the exterior of the barrel.

It can now be seen that there is provided a heat transfer unit for the zones of the extruder produced of a unitary aluminum casting which will nonetheless flex to the desired degree to conform to the outer barrel surface thus providing optimum efficiency in heat transfer from the barrel to the shell or vice versa.

Other modes of applying the principle of the invention may be employed, change being made as regards the details described, provided the features stated in any of the following claims or the equivalent of such be employed.

We, therefore, particularly point out and distinctly claim as our invention:

1. An extruder comprising an elongated cylinder through which material is forced, heat transfer means mounted on said cylinder comprising cylindrical cast metal shells, continuous heat transfer conduction means encased in each shell, and a longtiudinally extending weakness in each shell enabling the same to flex and conform closely to the exterior surface of said cylinder.

2. An extruder as set forth in claim 1 including a single longitudinally extending groove in each shell of radially flaring V-sectional shape at the center of the shell dividing said shell into two relatively movable sectors.

3. An extruder as set forth in claim 1 wherein each shell has two or more relatively closely spaced grooves in the exterior thereof extending completely longitudinally of the shell.

4. An extruder comprising an elongated cylinder through which material is forced, heat transfer means mounted on said cylinder comprising semi-cylindrical shells, continuous heat transfer conducting means in each shell, a longitudinally extending weakness in each shell enabling the same to flex and conform closely to the exterior surface of said cylinder, each shell being cast metal having a single longitudinally extending groove of radially flaring V-sectional shape at the center of the shell dividing said shell into two relatively movable quadrant sectors, said groove extending completely radially through said shell at the longitudinal center thereof, and bridge portions at each end of said groove joining two relatively movable quadrant sectors.

5. An extruder as set forth in claim 4 wherein said heat transfer conducting means extends between said sectors through said bridge portions.

6. An extruder as set forth in claim 1 wherein said weakness comprises a longtiudinally extending groove in the exterior of each cast metal shell, and integral cast metal bridge means across said groove joining the sections of the shell divided by said groove.

7. A heat transfer unit for extruder barrels comprising a cylindrical jacket for the barrel comprised of at least two cast aluminum cylindrical shells adapted to be clamped to said barrel, continuous heat transfer conducting means embedded in each cast aluminum cylindrical shell, and longitudinally extending exterior groove means in each shell enabling the same to flex and conform to said barrel when clamped thereto.

References Cited by the Examiner
UNITED STATES PATENTS

| | | | |
|---|---|---|---|
| 2,317,597 | 5/1943 | Ford et al. | 18—38 |
| 2,541,201 | 2/1951 | Buecken et al. | 18—12 |
| 2,659,933 | 11/1953 | Hawkinson | 18—18 |
| 2,769,201 | 11/1956 | Corenian | 18—12 |
| 2,868,938 | 1/1959 | Barfield et al. | |
| 2,916,769 | 12/1959 | Baigent | 18—12 X |
| 2,959,661 | 11/1960 | Bothwell et al. | 219—535 X |
| 3,119,149 | 1/1964 | Nelson | 18—12 |

WILLIAM J. STEPHENSON, *Primary Examiner.*